US010498266B2

(12) United States Patent
Ikenaga

(10) Patent No.: US 10,498,266 B2
(45) Date of Patent: Dec. 3, 2019

(54) RESOLVER CORRECTION DEVICE AND SEMICONDUCTOR DEVICE

(71) Applicant: RENESAS ELECTRONICS CORPORATION, Tokyo (JP)

(72) Inventor: Yoshifumi Ikenaga, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 83 days.

(21) Appl. No.: 15/681,852

(22) Filed: Aug. 21, 2017

(65) Prior Publication Data
US 2018/0062548 A1 Mar. 1, 2018

(30) Foreign Application Priority Data

Aug. 23, 2016 (JP) .................................. 2016-162742

(51) Int. Cl.
H02P 6/16 (2016.01)
H02P 6/15 (2016.01)

(52) U.S. Cl.
CPC ................ H02P 6/153 (2016.02); H02P 6/16 (2013.01)

(58) Field of Classification Search
CPC .............................. H02K 37/04; H02P 21/22
See application file for complete search history.

(56) References Cited

U.S. PATENT DOCUMENTS

| 6,972,700 B2* | 12/2005 | Kanekawa | B60T 8/885 318/563 |
| 2007/0029955 A1* | 2/2007 | Kanekawa | H03M 1/485 318/144 |
| 2007/0201171 A1* | 8/2007 | Kanekawa | H03M 1/1004 361/42 |

FOREIGN PATENT DOCUMENTS

| JP | H08-307208 A | 11/1996 |
| JP | 2002-344310 A | 11/2002 |

* cited by examiner

Primary Examiner — Bickey Dhakal
Assistant Examiner — Charles S Laughlin
(74) Attorney, Agent, or Firm — McDermott Will & Emery LLP

(57) ABSTRACT

To correct a frequency deviation generated in an input signal to an analog filter according to the rotation of a rotor in a resolver, a resolver correction device includes a phase shifter which shifts the phase of a first phase signal of the resolver, with respect to the signals at least having two phases and more, detected by the resolver. The phase-shifted first phase signal and a second phase signal are added, as a phase modulation signal with the excitation signal modulated by a rotation angle of the rotor in the resolver. A phase difference correction signal is generated based on a phase difference between the phase modulation signal of the resolver and the excitation signal. The adjusting amount of the phase shifter is calculated based on the phase difference correction signal, in which the phase shifter adjusts a phase shift amount according to the adjusting amount.

7 Claims, 13 Drawing Sheets

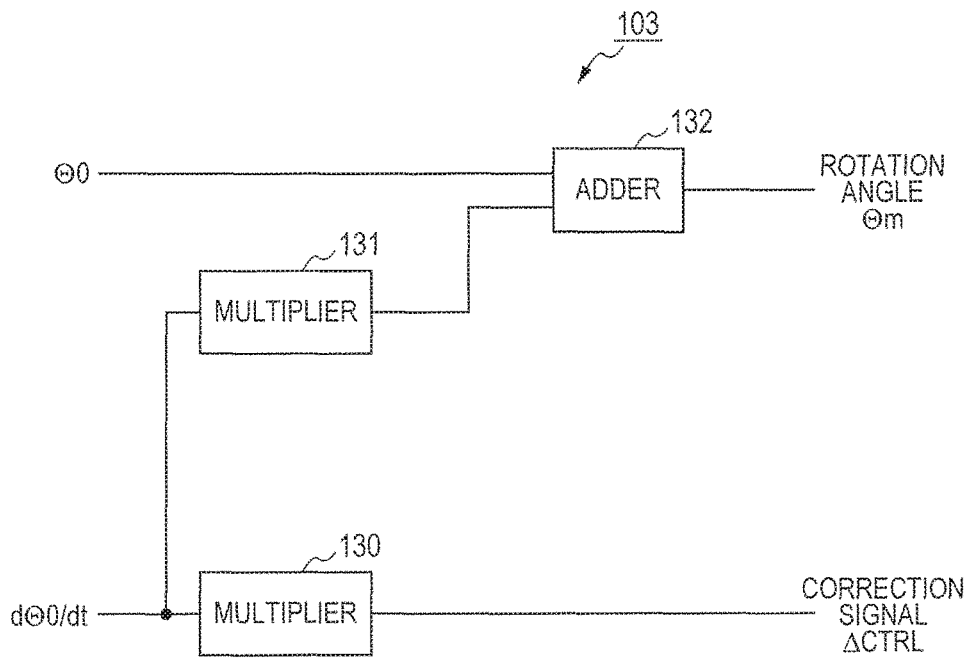
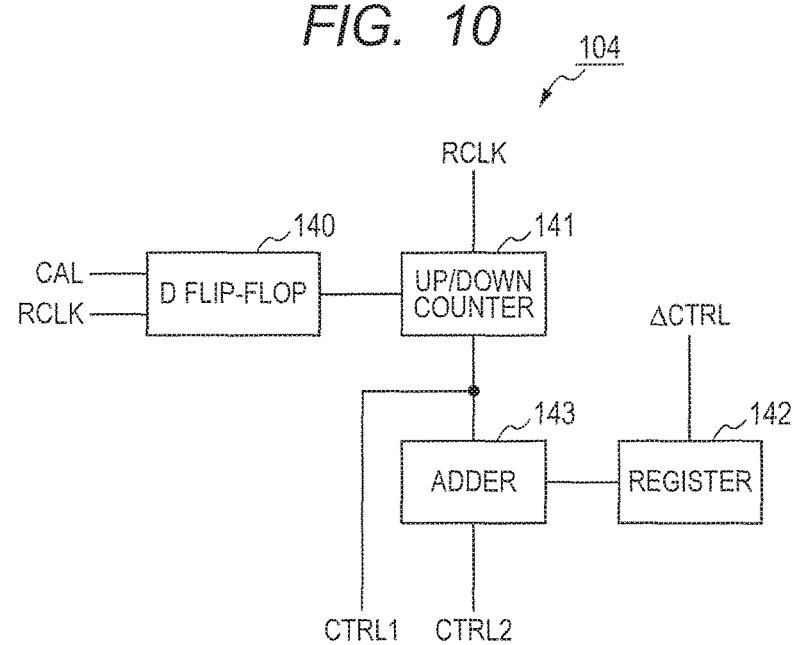

RESOLVER CORRECTION DEVICE AND SEMICONDUCTOR DEVICE

CROSS-REFERENCE TO RELATED APPLICATIONS

The disclosure of Japanese Patent Application No. 2016-152742 filed on Aug. 23, 2016 including the specification, drawings and abstract is incorporated herein by reference in its entirety.

BACKGROUND

The invention relates to a resolver correction device and a semiconductor device and particularly to a resolver correction device and a semiconductor device used for controlling a motor.

Japanese Unexamined Patent Application Publication No. Hei 8 (1996)-307208 describes that two all path filters (APF: All Pass Filter) having different phase shift amounts are used and designed to shift the phase of one output from the phase of the other output by a predetermined amount, hence to obtain a predetermined shift amount in a wider band width because each shift amount of the signal frequency has the same degree of variation.

Japanese Unexamined Patent Application Publication No. 2002-344310 describes that a phase shift amount is detected and controlled to a predetermined value, hence to obtain a predetermined phase shift amount by using an APF replica as a variable delay circuit.

SUMMARY

According to the technique disclosed in Japanese Unexamined Patent Application Publication No. Hei 8 (1996)-307208, analog elements such as a resistor and a capacitor are used for a filter and therefore, when the element characteristic of the resistor and the capacitor varies according to a temperature change, a difference of the shift amount between the two all path filters varies disadvantageously.

In order to solve the problem, in Japanese Unexamined Patent Application Publication No. 2002-344310, by applying a replica reflecting the element characteristic such as the resistor and the capacitor as a variable delay circuit, the element specified value is adjusted (for example, adjust the variable resistor value) to cancel the change of the element characteristic according to the temperature change.

When Resolver to Digital Converter (RDC) circuit is formed by the analog filter used in the above both publications, a frequency deviation occurs in the input signal to the analog filter according to the rotation of a rotor of the resolver. Error of the shift amount for this frequency deviation cannot be corrected disadvantageously.

Other objects and novel characteristics will be apparent from the description of this specification and the attached drawings.

According to one embodiment, with respect to the phase shift amount of a phase shifter, it is possible to correct a frequency deviation according to the rotation of the rotor based on the time differential of the phase difference between the phase modulation signal and the excitation signal and to correct a variation of the phase shift amount of a phase shifter replica for shifting the phase of the excitation signal.

According to the embodiment, it is possible to correct a frequency deviation generated in an input signal to an analog filter, accompanying the rotation of the rotor in the resolver.

BRIEF DESCRIPTION OF THE DRAWINGS

FIG. 9 is a circuit diagram showing one example of the structure of a frequency error correction unit according to the first embodiment.

FIG. 10 is a circuit diagram showing one example of the structure of an adjuster according to the first embodiment.

DETAILED DESCRIPTION

Figure 1:
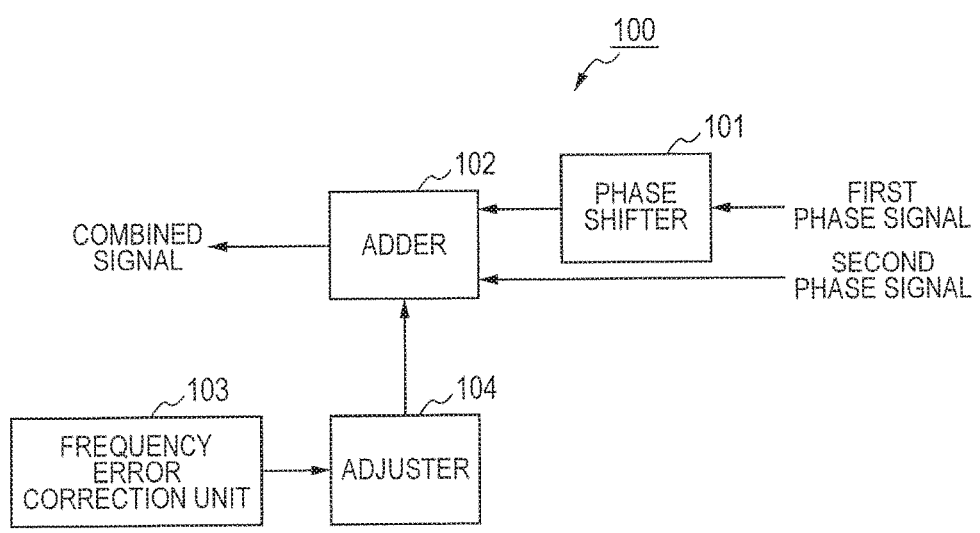
FIG. 1 is a block diagram showing the structure of a resolver correction device according to the outline of the embodiment.

For the sake of clearer description, the following description and drawings are properly omitted and abbreviated. Further, each element described in the drawings as a function block of performing various processing can be formed by CPU, memory, and the other circuit as the hardware and realized by a program loaded into a memory as the software. Therefore, those skilled in the art understand that these function blocks can be realized by only the hardware, only the software, or their combination and not restricted to one of them. In the drawings, the same reference numerals are attached to the same elements and the overlapping description is omitted depending on the necessity.

Outline of Embodiment

FIG. 1 is a block diagram showing the structure of a resolver correction device according to one embodiment. In FIG. 1, a resolver correction device 100 includes a phase shifter 101, an adder 102, a frequency error correction unit 103, and an adjuster 104.

The phase shifter 101 shifts the phase of a first phase signal, of the signals at least having two phases and more, detected from the resolver excited by an excitation signal of a carrier frequency fc. Further, the phase shifter 101 adjusts the phase shift amount based on the adjusting amount described later.

The adder 102 adds the first phase signal phase-shifted by the phase shifter 101 and a second phase signal not phase-shifted. Then, the adder 102 outputs the added signal as a phase modulation signal.

The frequency error correction unit 103 generates a phase difference correction signal based on a phase difference between the phase modulation signal of the resolver and the excitation signal.

The adjuster 104 calculates the adjusting amount of the phase shifter 101, based on the phase difference correction signal generated in the frequency error correction unit 103.

Thus, the resolver correction device according to the outline of the embodiment adjusts the phase shift amount of the phase shifter 101, according to the phase difference correction signal based on the phase difference between the excitation signal not phase-shifted and the excitation signal phase-shifted by the phase shifter replica and the phase difference between the phase modulation signal of the resolver and the excitation signal, hence to be able to correct a frequency deviation generated in the input signal to the analog filter according to the rotation of the rotor of the resolver.

First Embodiment

In a first embodiment, the detailed structure of the resolver correction device 100 having been described in the outline of the embodiment and a controller of a motor using the resolver correction device 100 will be described.

Figure 2:
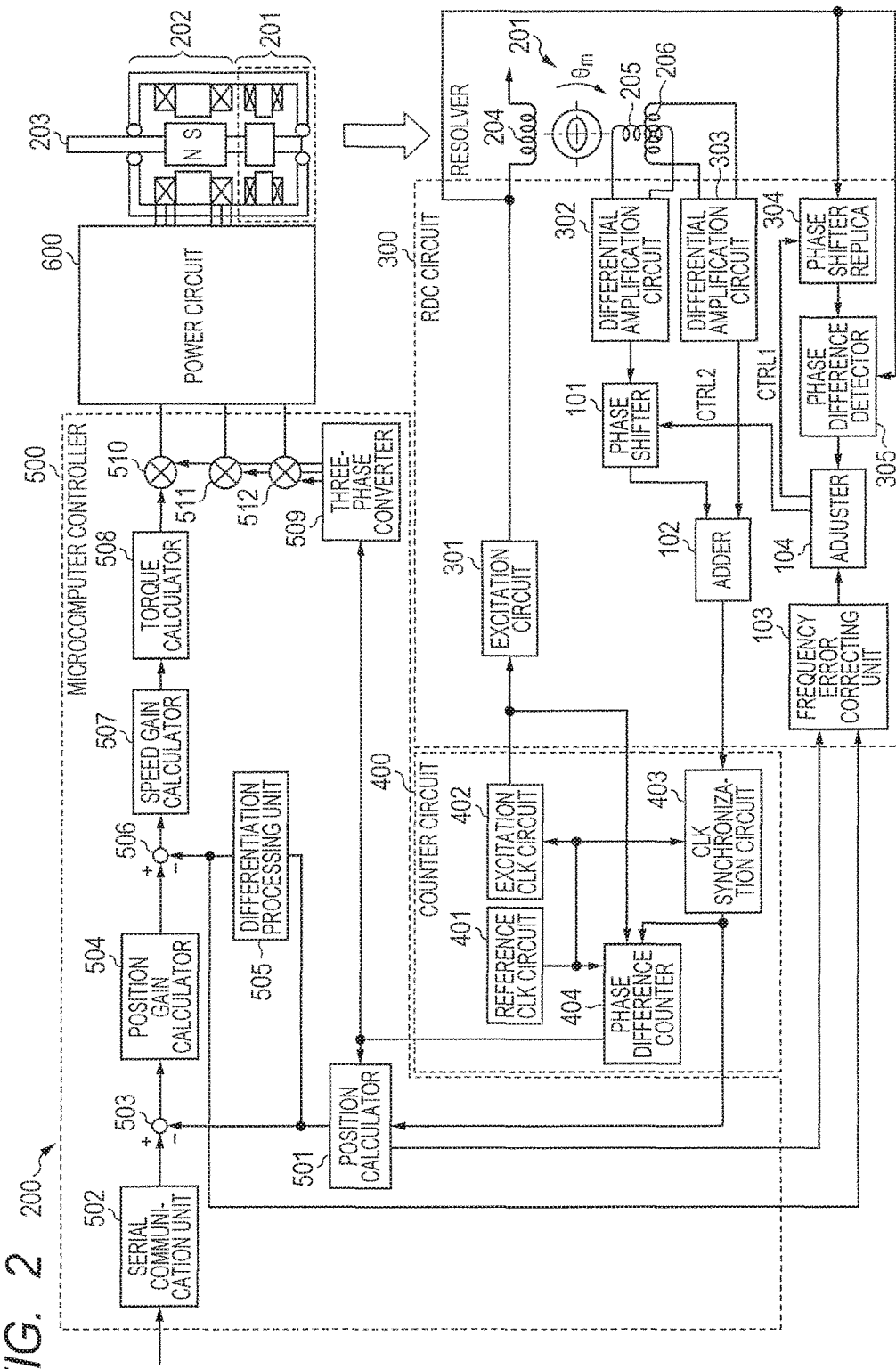
FIG. 2 is a block diagram showing the structure of a controller according to a first embodiment.

At first, each function of the components in a signal processor and a controller according to the first embodiment will be described. FIG. 2 is a block diagram showing the structure of the controller according to the first embodiment.

In FIG. 2, the controller 200 includes an RDC circuit 300, a counter circuit 400, a microcomputer controller 500, and a power circuit 600. The controller 200 controls the rotation of a motor 202 according to a signal from a resolver 201. The resolver 201 and the motor 202 rotate together with their rotor portions fixed to a rotation shaft 203.

The resolver 201 further includes an excitation coil 204, a detection coil 205, and a detection coil 206. The excitation coil 204 is a coil for generating a magnetic field according to the input electric signal. The detection coils 205 and 206 are coils for detecting a fluctuation in the magnetic field and outputting it as the electric signal.

In the resolver 201, the excitation coil 204 and the detection coils 205 and 206 are arranged in a stator portion and a fluctuation in the magnetic field is detected according to the rotation of the rotor portion. Whatever resolver will do as the resolver 201 as far as it can detect a fluctuation in the magnetic field according to the rotation of the rotor with the electric signals at least having two phases and more; for example, with the excitation coil 204 arranged in the rotor portion and the detection coils 205 and 206 arranged in the stator portion, a fluctuation in the magnetic field may be detected according to the rotation of the rotor portion.

Since the detection coils 205 and 206 are arranged to have a predetermined angle, the detection coils 205 and 206 detect a fluctuation in the magnetic field as the signals mutually having different phases. For example, when the detection coils 205 and 205 are arranged at an angle of 90°, the detection coil 205 detects a sine wave and the detection coil 206 detects a cosine wave.

The structure of the RDC circuit 300 will be described. The RDC circuit 300 includes an excitation circuit 301, a differential amplification circuit 302, a differential amplification circuit 303, a phase shifter replica 304, a phase difference detector 305, the phase shifter 101, and the adder 102.

The excitation circuit 301 generates an excitation signal of sine wave with a frequency fc obtained by dividing a reference clock signal and outputs the excitation signal to the excitation coil 204 of the resolver 201 and the phase shifter replica 304.

The differential amplification circuit 302 amplifies the signal detected by the detection coil 205 and outputs the above signal to the phase shifter 101. Further, the differential amplification circuit 303 amplifies the signal detected by the detection coil 206 and outputs the above to the adder 102.

The adder 102 adds the first phase signal phase-shifted by the phase shifter 101 and the second phase signal not phase-shifted. The adder 102 outputs the added signal to a CLK synchronization circuit 403.

The phase shifter replica 304 shifts the phase of the excitation signal in the resolver. Under the same operation condition, the phase shift amount of the phase shifter replica 304 is the same as that of the phase shifter 101. The phase shifter replica 304 outputs the phase-shifted excitation signal to the phase difference detector 305.

The phase difference detector 305 detects a phase difference between the excitation signal not phase-shifted and the excitation signal phase-shifted by the phase shifter replica 304. Then, the phase difference detector 305 outputs the detected phase difference to the adjuster 104.

The frequency error correction unit 103 generates the phase difference correction signal based on the phase difference between the phase modulation signal of the resolver and the excitation signal. The frequency error correction unit 103 outputs the phase difference correction signal to the adjuster 104.

The adjuster 104 calculates the adjusting amount of the phase shifter 101, based on the phase difference detected in the phase difference detector 305 and the phase difference correction signal generated in the frequency error correction unit 103.

The structure of the counter circuit 400 will be described. The counter circuit 400 includes a reference CLK circuit 401, an excitation CLK circuit 402, the CLK synchronization circuit 403, and a phase difference counter 404.

The reference CLK circuit 401 generates a signal of a reference frequency and outputs the generated reference clock signal to the excitation CLK circuit 402, the CLK synchronization circuit 403, and the phase difference counter 404.

The excitation CLK circuit 402 divides the reference clock signal generated in the reference CLK circuit 401 and outputs the clock signal of the carrier frequency obtained through dividing to the excitation circuit 301 and the phase difference counter 404.

The CLK synchronization circuit 403 detects the shaped phase modulation signal and the shaped excitation signal at the same time and outputs the detected signal to the phase difference counter 404 and a position calculator 501.

The phase difference counter 404 counts the phase difference obtained by the synchronization detection with the resolution of the reference frequency and outputs the count result to the position calculator 501 and a three-phase converter 509.

The structure of the microcomputer controller 500 will be described. The microcomputer controller 500 includes the position calculator 501, a serial communication unit 502, a subtracter 503, a position gain calculator 504, a differentiation processing unit 505, a subtracter 506, a speed gain calculator 507, a torque calculator 508, the three-phase converter 509, and multipliers 510, 511, and 512.

The position calculator 501 calculates a position detected value according to the detection signal and the count result of the phase difference and outputs the above to the subtracter 503 and the differentiation processing unit 505.

The serial communication unit 502 receives a position command signal externally and outputs a position, command value to the subtracter 503. The subtracter 503 subtracts the position command value from the position detected value and outputs the obtained position deviation to the position gain calculator 504.

The position gain calculator 504 calculates a target speed of the motor 202 by multiplying the position deviation by a predetermined position gain. The differentiation processing unit 505 differentiates the detection signal indicating the rotational position and calculates the rotation speed of the motor 202. The subtracter 506 subtracts the speed detected value from the target speed and outputs the obtained speed deviation to the speed gain calculator 507.

The speed gain calculator 507 multiplies the speed deviation by the speed gain to calculate a torque command value. The torque calculator 508 calculates a current command value flowing to each phase of the motor 202 according to the torque command value. The three-phase converter 509 generates a three-phase signal according to the count result of the phase difference and outputs the three-phase signal to the multipliers 510, 511, and 512.

The multipliers 510, 511, and 512 multiply the respective current command values by the three-phase signal to generate control signals for three phases and output the three-phase control signals to the power circuit 600. The power circuit 600 is an inverter for controlling the motor 202 in the three-phase Pulse Width Modulation (PWM) based on the three-phase control signals.

According to the above structure, the controller 200 detects the rotation angle of the rotor and controls the motor. Next, the operation of the controller 200 will be described.

The excitation circuit 301 shapes the clock waveform V0 output from the excitation CLK circuit 402 into a sine wave. The signal shaped into the sine wave is input to the excitation coil 204 of the resolver 201 and the phase shifter replica 304 as the excitation signal.

In the resolver 201, output signals E1 and E2 are output depending on the rotation angle θm of the rotor in the resolver 201 rotating in synchronization with the motor 202. Here, when the excitation signal is assumed as $E0=E \sin(\omega t)$, the output signal E1 of the detection coil 205 is represented as $E1=\alpha E \sin \theta m \times \sin (\omega t)$. Further, the output signal E2 of the detection coil 206 is represented as $E2=\alpha E \cos \theta m \times \sin (\omega t)$. Here, the symbol E is the maximum amplitude value of the excitation signal, ω is the angular velocity of the excitation signal, t is the time, and α is the constant determined by the structure of the resolver.

The output signal E1 is amplified in the differential amplification circuit 302 to be a signal V1. The signal V1 is represented as $V1=\beta \alpha E \sin \theta m \times \sin(\omega t)$. Further, the output signal. E2 is amplified in the differential amplification circuit 303 to be a signal V2. The signal V2 is represented as $V2=\beta \alpha E \cos \theta m \times \sin(\omega t)$. Here, the symbol β is the constant determined by the structure of the differential amplification circuit.

The signal V2 is to advance the phase by $\pi/2+\Delta\theta s$ in the phase shifter 101. The phase-advanced signal V3 based on the signal V2 is output from the phase shifter 101 to the adder 102. Here, the symbol Δθs is the angle depending on the rotation speed dθm/dt of the rotor in the resolver. Further, the symbol Δθs is the value determined based on the output ΔCTRL from the frequency error correction unit 103 described later.

The adder 102 resistance-divides the signal V1 and a signal V3 to obtain a signal with an average voltage (V1+ V3)/2. The signal with thus obtained average voltage is input to a comparator within the adder 102 and shaped into a square wave V4. The obtained square wave V4 is input to the CLK synchronization circuit 403.

The V4 and V0 are input from the respective timer input terminals to the CLK synchronization circuit 403. The CLK synchronization circuit 403 obtains a detection signal.

The position calculator 501 detects the phase difference θ0 between the V4 and the V0 from the detection signal. Further, the differentiation processing unit 505 calculates the time differentiation dθ0/dt of the phase difference θ0.

The frequency error correction unit 103 generates a correction signal ΔCTRL based on the time differentiation dθ0/dt of the detected phase difference θ0. The correction signal ΔCTRL is output from the frequency error correction unit 103 to the adjuster 104. This correction signal ΔCTRL is a signal for correcting the frequency deviation of the input signal to the analog filter generated according to the rotation of the rotor in the resolver.

On the other hand, the phase shifter replica 304 receives the excitation signal. $E0=E \sin(\omega t)$. Then, in the phase shifter replica 304, the excitation signal advances the phase by 90 degree and the signal $E0'=E \sin(\omega t+\pi/2)$ is output.

The excitation signal not phase-shifted and the excitation signal phase-shifted by the phase shifter replica 304 are input to the phase difference detector 305. Then, the phase difference detector 305 detects a phase difference between the excitation signal not phase-shifted and the excitation signal phase-shifted by the phase shifter replica 304.

When the phase shift amount by the phase shifter replica 304 is 90 degree, the phase difference detected by the phase difference detector 305 becomes 90 degree. Here, when the phase shift amount of the phase shifter replica 304 (and the phase shifter 101) changes from 90 degree according to a change of the operation condition such as temperature, also the phase difference detected by the phase difference detector 305 becomes a value changed from 90 degree.

In other words, the phase difference detector 305 detects a variation in the phase shift amount of the phase shifter replica 304 according to a change of the operation condition such as temperature. Since the phase shifter replica 304 has the same structure as the phase shifter 101, the phase difference detector 305 can detect a variation in the phase shift amount of the phase shifter 101, indirectly according to a change of the operation condition such as temperature.

The signal input to the phase difference detector 305 is not modulated by the rotation angle of the rotor in the resolver, and therefore, the phase difference detector 305 can detect a variation in the phase shift amount according to a change of the operation condition such as temperature, without being effected by a change in the rotation of the rotor.

The adjuster 104 calculates the adjusting amount of the phase shifter based on the signal ΔCTRL for correcting the frequency deviation according to the rotation of the rotor and the variation of the phase shift amount accompanying a change of the operation condition.

The phase shifter 101 adjusts the phase shift amount according to this adjusting amount. The phase shifter 101 shifts the phase of the first phase signal, of the signals having at least two phases and more, detected by the resolver excited by the excitation signal of the carrier frequency fc, by the adjusted phase shift amount.

As mentioned above, the controller according to the first embodiment corrects the frequency deviation accompanying the rotation of the rotor, based on the time differentiation of the phase difference between the phase modulation signal and the excitation signal, with respect to the phase shift amount by the phase shifter, and corrects the variation of the phase shift amount of the phase shifter replica for shifting the phase of the excitation signal, hence to be able to shift the phase of the signal detected by the resolver by a constant phase shift amount.

Figure 3:
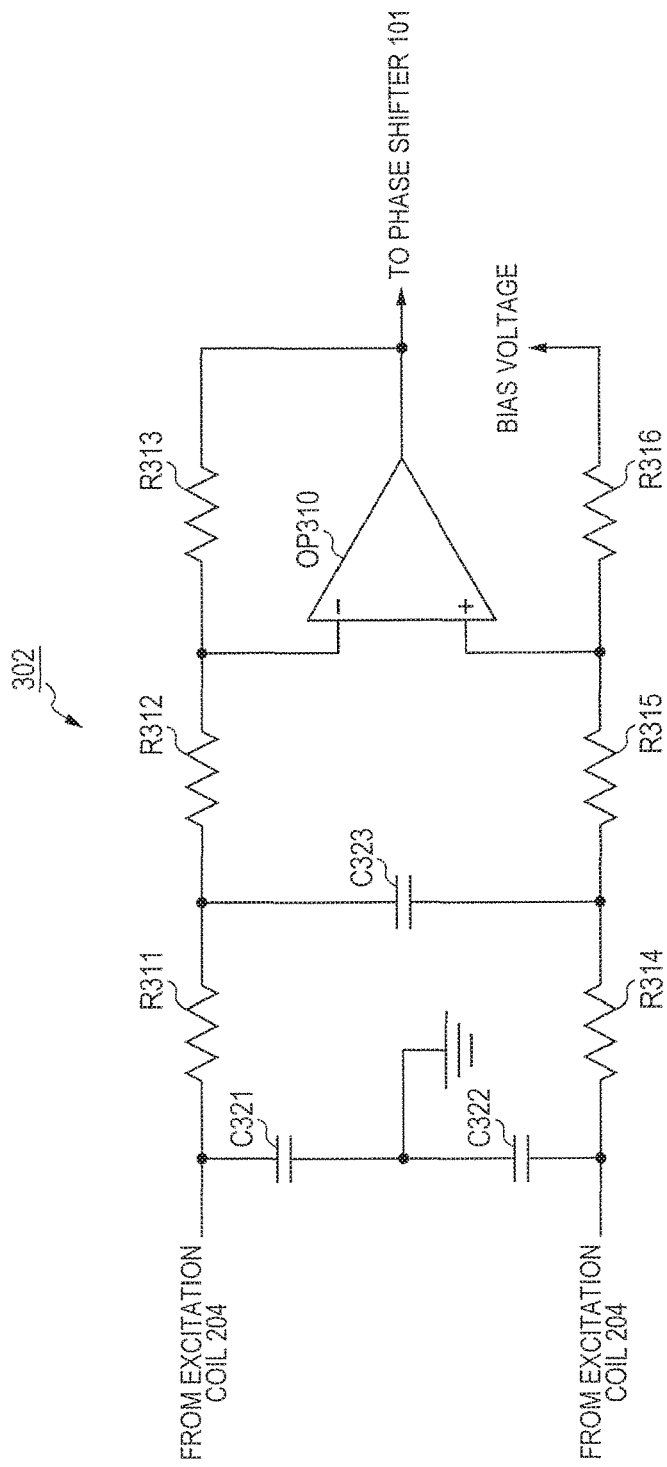
FIG. 3 is a circuit diagram showing one example of the structure of a differential amplification circuit according to the first embodiment.

Next, the structure of the differential amplification circuit 302 and the differential amplification circuit 303 will be described. FIG. 3 is a circuit diagram showing one example of the structure of the differential amplification circuit according to the first embodiment. In FIG. 3, the differential amplification circuit 302 (or the differential amplification circuit 303) includes an OP amplifier OP310, resistors R311, R312, R313, R314, R315, and R316, and capacitors C321, C322, and C323.

In FIG. 3, one end of the resistor R311 is coupled to the excitation coil 204 and the capacitor C321 and the other end thereof is coupled to the resistor R312 and the capacitor C323.

One end of the resistor R312 is coupled to the resistor R311 and the capacitor C323 and the other end thereof is coupled to the resistor R313 and an inverting input terminal of the OP amplifier OP310.

One end of the resistor R313 is coupled to the resistor R312 and the inverting input terminal of the OP amplifier OP310 and the other end thereof is coupled to an output terminal of the OP amplifier OP310.

One end of the resistor R314 is coupled to the excitation coil 204 and the capacitor C322 and the other end thereof is coupled to the resistor R315 and the capacitor C323.

One end of the resistor R315 is coupled to the resistor R314 and the capacitor C323 and the other end thereof is coupled to the resistor R316 and a non-inverting input terminal of the OP amplifier OP310.

One end of the resistor R316 is coupled to the resistor R315 and the non-inverting input terminal of the OP amplifier OP310 and the other end thereof is coupled to a bias voltage.

The connection point of the capacitors C321 and C322 is grounded.

The output terminal of the OP amplifier OP310 is coupled to the phase shifter 101.

According to the above circuit structure, the differential amplification circuit 302 can amplify a voltage between the two terminals of the excitation coil 204 and output the same voltage to the phase shifter 101.

The differential amplification circuit 303 can be formed in the same structure as the differential amplification circuit 302. In the differential amplification circuit 303, the resistor R311 and the resistor R314 are coupled to the two terminals of the excitation coil 205 and the output terminal of the OP amplifier OP310 is coupled to the adder 102.

Figure 4:
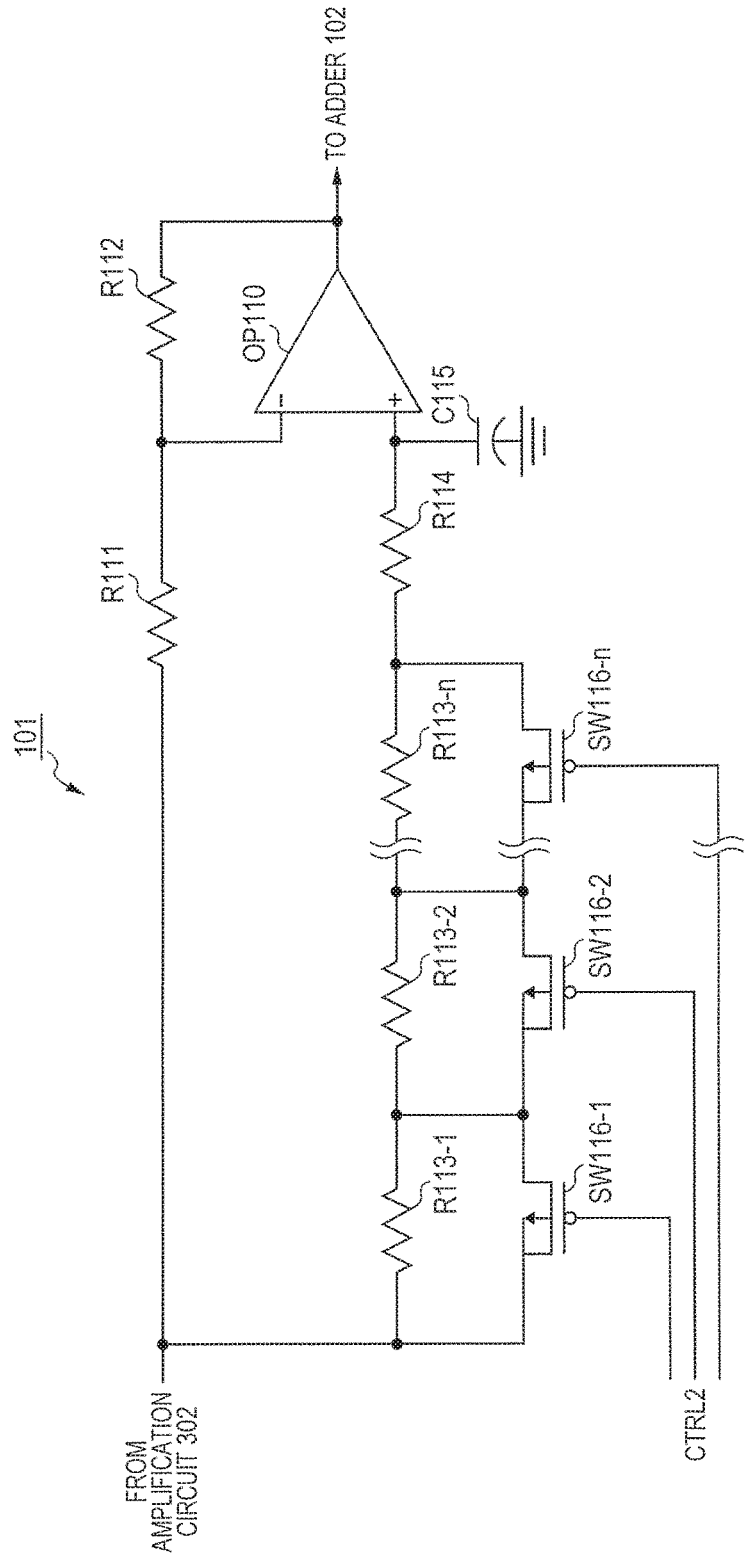
FIG. 4 is a circuit diagram showing one example of the structure of a phase shifter according to the first embodiment.

The structure of the phase shifter 101 will be described. FIG. 4 is a circuit diagram showing one example of the structure of the phase shifter according to the first embodiment. In FIG. 4, the phase shifter 101 includes an OP amplifier OP110, resistors R111, R112, R113-1 to 113-$n$ ($n$ is a positive integer) and R114, a capacitor C115, and bypass switches SW116-1 to 116-$n$ ($n$ is a positive integer) respectively formed by P channel MOS transistors.

One end of the resistor R111 is coupled to the amplification circuit 302, the resistor R113-1, and the switch SW116-1 and the other end thereof is coupled to the resistor R112 and an inverting input terminal of the OP amplifier OP110.

One end of the resistor R112 is coupled to the resistor R111 and the inverting input terminal of the OP amplifier OP110 and the other end thereof is coupled to an output terminal of the OP amplifier OP110.

The resistor R113-1 and the switch SW116-1 forms a parallel circuit; one end thereof is coupled to the amplification circuit 302 and the resistor R111 and the other end thereof is coupled to the resistor R113-2 and the switch SW116-2.

The resistor R113-2 and the switch SW116-2 forms a parallel circuit; one end thereof is coupled to the resistor R113-1 and the switch SW116-1 and the other end thereof is coupled to the resistor R113-3 and the switch SW116-3.

Similarly, the parallel circuits including the resistors R113 and the switches SW116 are coupled in series.

The resistor R113-$n$ and the switch SW116-$n$ forms a parallel circuit; one end thereof is coupled to the resistor R113-$n$–1 (not illustrated) and the switch SW116-$n$–1 (not illustrated) and the other end thereof is coupled to the resistor R114.

One end of the resistor R114 is coupled to the resistor R113-$n$ and the switch SW116-$n$ and the other end thereof is coupled to the capacitor C115 and a non-inverting input terminal of the OP amplifier OP110.

One end of the capacitor C115 is coupled to the R114 and the other end thereof is grounded.

According to a variation of the value of the resistor coupled to the non-inverting input terminal of the OP amplifier OP110 from the amplification circuit 302, the phase shift amount varies in the phase shifter 101.

Specifically, according to the control signal CTRL2 from the adjuster 104, the bypass switches SW116-1 to 116-$n$ in the phase shifter 101 are controlled open or close. When the switch SW116-1 is closed, a signal from the amplification circuit 302 goes through the switch SW116-1, bypassing the resistor R113-1. When the switch SW116-1 is opened, a signal from the amplification circuit 302 goes through the resistor R113-1. Similarly, signal from the amplification circuit 302 bypasses or goes through the resistors R113-2 to R113-$n$ and enters into the non-inverting input terminal of the OP amplifier OP110 according to the open or close operation of the switches SW116-2 to 116-$n$.

As the result, the value of the resistor coupled to the non-inverting input terminal of the OP amplifier OP110 from the amplification circuit 302 is controlled according to the open or close operation of the bypass switches SW116-1 to 116-$n$.

The values of the resistors R113-1 to R113-$n$ may be identical or various. For example, the value of the resistor R113-2 may be double the value of the resistor R113-1, the value of the resistor R113-3 may be double the value of the resistor R113-2 (in short, quadruple the value of the resistor R113-1), and the value of the resistor R113-$n$ may be double the value of the resistor R113-$n$–1 (in short, 2$n$–1 times more than the resistor R113-1). The combination of these resistor values includes 2$n$+1 types of resistor values.

The adjuster 104 adjusts the value of the serial resistor including the resistors R113-1 to R113-$n$ while controlling the open and close operation of the bypass switches 116-1 to 116-$n$ in order to always keep the phase shift amount of the phase shifter 101 at 90 degree even when the operation condition varies. The phase shifter replica 304 is formed in the same circuit structure as the phase shifter 101 shown in FIG. 4, including the OP amplifier OP110, the resistors R111, R112, R113-1 to 113-n (n is a positive integer) and R114, the capacitor C115, and the bypass switches SW116-1 to 116-n (n is a positive integer). The input signal and the output signal, however, are changed as described in FIG. 1. The control signal CTRL1 from the adjuster 104 is used for controlling the open and close operation of the bypass switches SW116-1 to 116-n (n is the positive integer) in the phase shifter replica 304.

Figure 5:
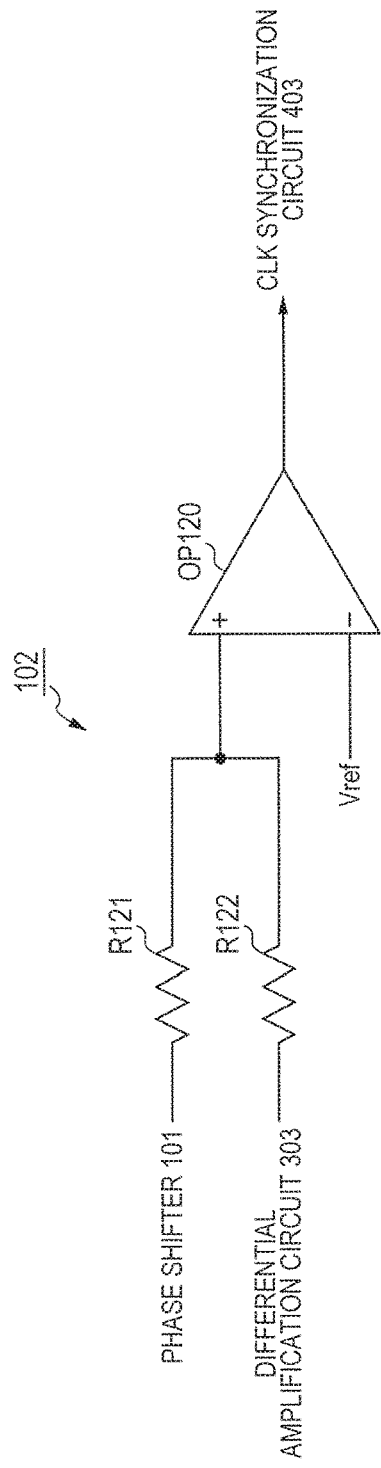
FIG. 5 is a circuit diagram showing one example of the structure of an adder according to the first embodiment.

The structure of the adder 102 will be described. FIG. 5 is a circuit diagram showing one example of the structure of the adder according to the first embodiment. In FIG. 5, the adder 102 includes an OP amplifier OP120 and resistors R121 and R122.

One end of the resistor R121 is coupled to the output terminal of the phase shifter 101 and the other end thereof is coupled to the resistor 122 and a non-inverting input terminal of the OP120. One end of the resistor R121 is coupled to the output terminal of the differential amplification circuit 303 and the other end thereof is coupled to the resistor 123 and the non-inverting input terminal of the OP120.

The OP amplifier OP120 is formed as a comparator. In other words, the output signal from the phase shifter 101 and the output signal from the differential amplification circuit 303 are input to the non-inverting input terminal of the OP amplifier OP120, respectively passing through the resistor R121 and the resister R122. Further, a reference voltage Vref is applied to an inverting input terminal of the OP amplifier OP120.

By comparison of the voltage of the combined signal of the output signal from the phase shifter 101 and the output signal from the differential amplification circuit 303 with the reference voltage Vref, the signal is shaped into a square wave. The signal shaped into the square wave is output to the CLK synchronization circuit 403.

Figure 6:
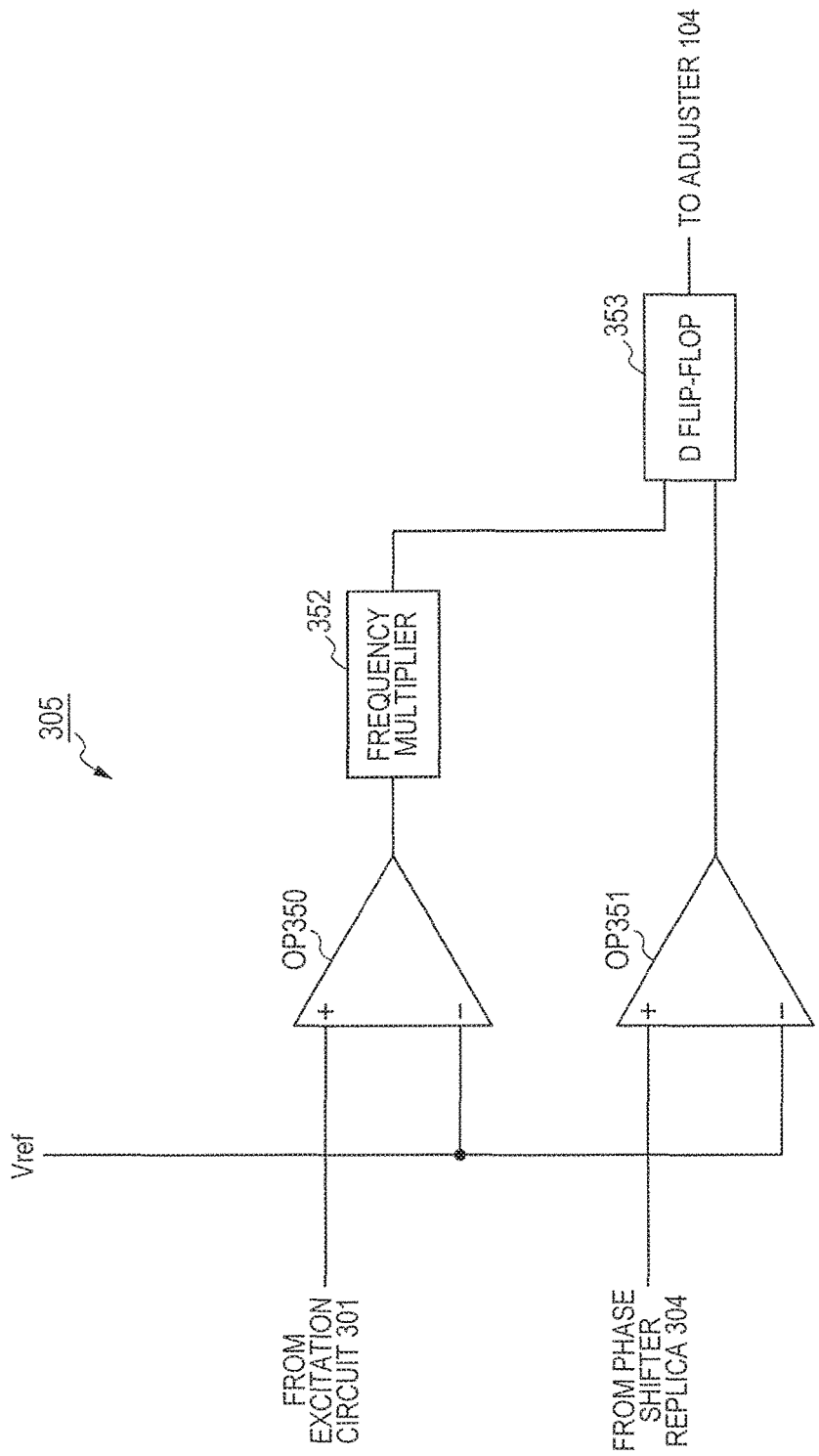
FIG. 6 is a circuit diagram showing one example of the structure of a phase difference detector according to the first embodiment.

The structure of the phase difference detector 305 will be described. FIG. 6 is a circuit diagram showing one example of the structure of the phase difference detector according to the first embodiment. In FIG. 6, the phase difference detector 305 includes an OP amplifier OP350, an OP amplifier OP351, a frequency multiplier 352, and a D flip-flop 353.

The OP amplifier OP350 is formed as a comparator. The excitation signal E0 is input to a non-inverting input terminal of the OP amplifier OP350. Further, the reference voltage Vref is applied to an inverting input terminal of the OP amplifier OP350. The signal CAL0 obtained by shaping the excitation signal E0 into a square wave is output from an output terminal of the OP amplifier OP350.

The OP amplifier OP351 is also formed as a comparator. The excitation signal E0' phase-shifted by the phase shifter replica 304 is input to a non-inverting input terminal of the OP amplifier OP351. The reference voltage Vref is applied to an inverting input terminal of the OP amplifier OP351. The signal CAL0 obtained by shaping the phase shifted excitation signal E0' into a square wave is output from an output terminal of the OP amplifier OP350.

The frequency multiplier 352 doubles the frequency of the signal CAL0. The frequency multiplier 352 outputs the signal CAL2 obtained by doubling the frequency of the signal CAL0 to the D flip-flop 353.

In the D flip-flop 353, the signal CAL2 is input to a D terminal and the signal CAL1 is input to a clock terminal. Then, the signal of the phase difference between the excitation signal not phase-shifted and the excitation signal phase-shifted by the phase shifter replica 304 is output from the D flip-flop 353.

Figure 7:
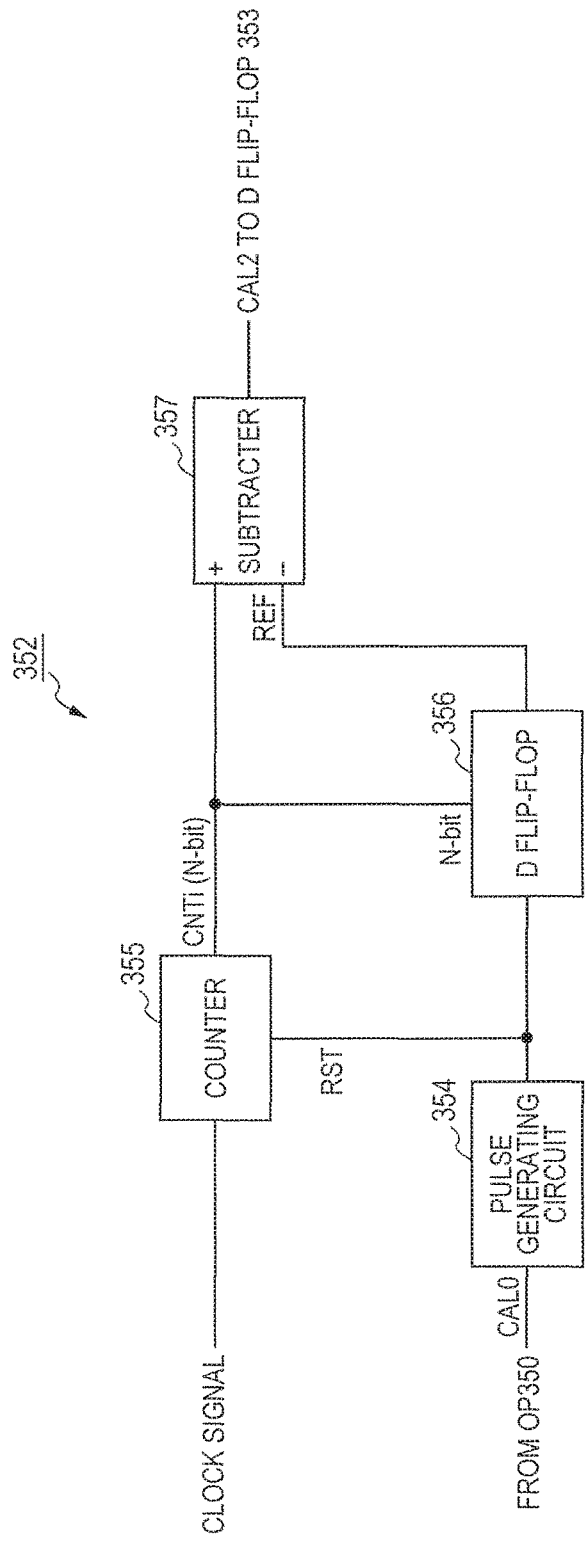
FIG. 7 is a circuit diagram showing one example of the structure of a frequency multiplier according to the first embodiment.

The structure of the frequency multiplier 352 will be described. FIG. 7 is a circuit diagram showing one example of the structure of the frequency multiplier according to the first embodiment. In FIG. 7, the frequency multiplier 352 includes a pulse generating circuit 354, a counter 355, a D flip-flop 356, and a subtracter 357.

The pulse generating circuit 354 generates a reset pulse signal RST at the rising and the falling of the signal CAL1. The signal RST is input to the reset terminal of the counter 355 and the clock terminal of the D flip-flop 356. Specifically, each counter output CNTi (i=1 to N:N is a positive integer) of N bits is input to each D terminal of the number N (N-bits) of the D flip-flops 356 and the input is latched at the rising up of the clock signal RST, hence to keep the half value of the counter output value at the RST rising.

The counter 355 keeps the count-up operation with the external clock signal and when the signal RST becomes 1, the output is returned to 0.

In the D flip-flop 356, the signal RST is input to the clock terminal and the output of the counter 355 is input to the D terminal.

Taking a difference between the counter output and the D flip-flop output, the subtracter 357 outputs the most significant bit as the CAL2. Specifically, when the counter output is less than the REF, CAL2=1, while when it is larger than the REF, CAL2=1. Since the REF is set at half of the maximum value of the counter, the CAL2 becomes the square wave with the frequency of the CAL1 doubled.

Figure 8:
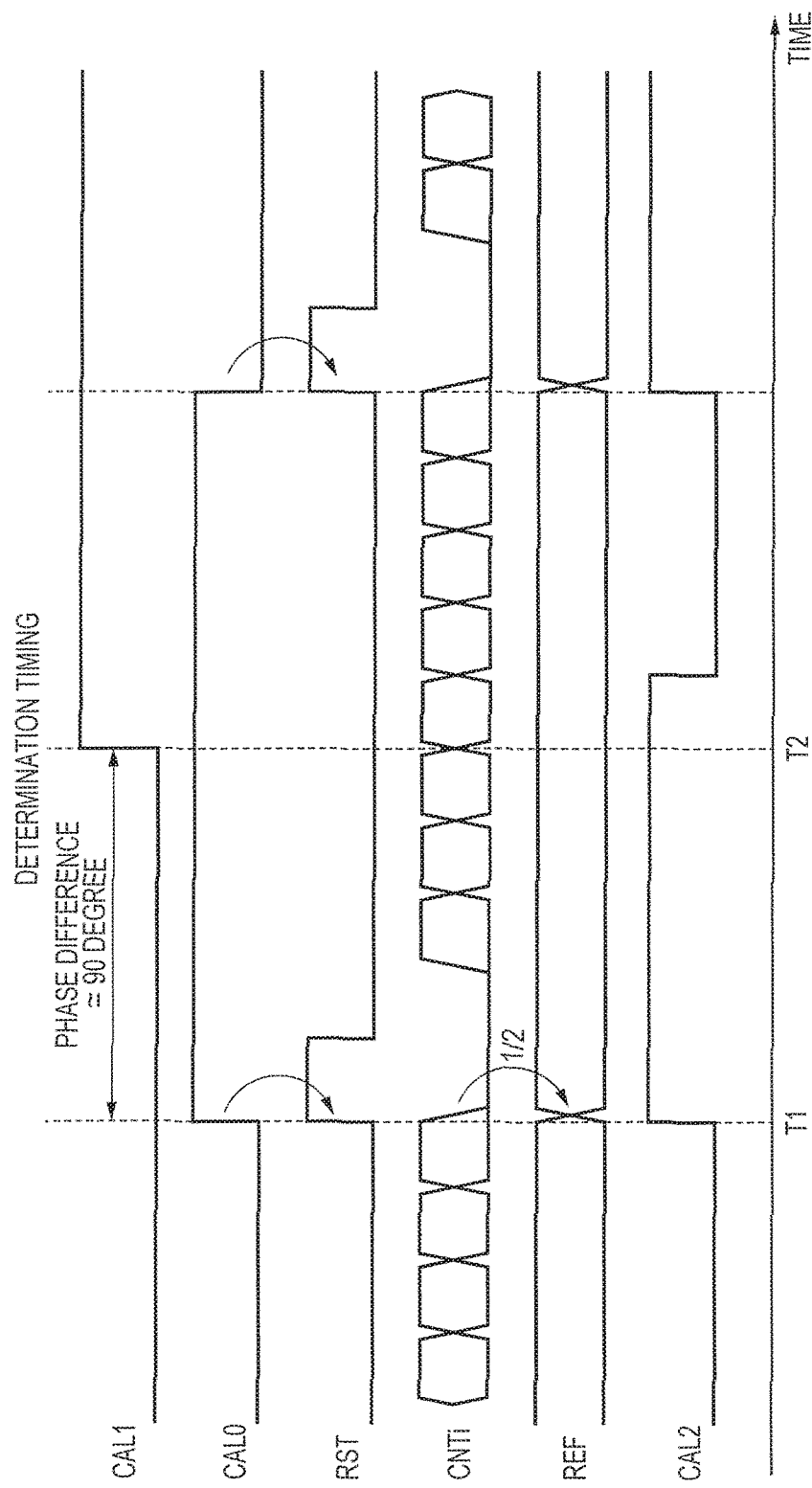
FIG. 8 is a view showing the operation waveform of the frequency multiplier according to the first embodiment.

Next, the operation of the frequency multiplier 352 will be described. FIG. 8 is a view showing the operation waveform of the frequency multiplier according to the first embodiment. In FIG. 8, the horizontal axis indicates time and the vertical axis indicates signal value. In FIG. 8, the CAL0 shows the signal obtained by shaping the excitation signal into a square wave. The CAL1 shows the signal obtained by shaping the phase shifted excitation signal into a square wave. The RST shows the output signal from a reset terminal of the pulse generating circuit 354. The CNTi shows the output from the counter 35. The REF shows the output signal from the D flip-flop 356. The CAL2 shows the signal with the frequency of the CAL0 doubled.

In FIG. 8, the counter 355 counts up with the external clock signal before the time T1. At the time T1, it is reset according to the RST signal and the D flip-flop 356 hands over the half of the count number by the counter 355 to the subtracter 357 as the REF.

According to this, the D flip-flop in the phase difference detector 305 supplies the value of the CAL2 at the time T2 of rising of the CAL1, as a determination signal CAL, to the adjuster 104.

Here, the output of the D flip-flop 353 in FIG. 6 becomes CAL=1 when the phase shift amount of the phase shifter replica 304 is less than $\pi/2$, While it becomes CAL=0 when it is more than $\pi/2$.

The structure of the frequency error correction unit 103 will be described. FIG. 9 shows one example of the structure of the frequency error correction unit according to the first embodiment. In FIG. 9, the frequency error correction unit 103 includes a multiplier 130, a multiplier 131, and an adder 132.

The multiplier 130 outputs the correction signal $\Delta$CTRL obtained by multiplying the phase difference $\theta 0$ by the time differential $d\theta 0/dt$.

The multiplier 131 multiplies the time differential dθ0/dt of the phase difference θ0 by D and outputs the above to the adder 132.

The adder 132 adds the phase difference θ0 to the value obtained by multiplying the time differential dθ0/dt by D and outputs the obtained rotation speed θm.

The frequency error correction unit 103 outputs the correction signal ΔCTRL, based on the time differential dθ0/dt of the phase difference θ0 detected by the differential processing unit 505. Specifically, the correction signal ΔCTRL is set in proportion to dθ0/dt so that the difference ΔR between the resistor value within the phase shifter 101 when the control signal CTRL1 is output from the adjuster 104 and the resistor value when the CTRL1+ΔCTRL is output may be ΔR=γ×(dθ0/dt). Here, the symbol γ is the constant determined by the value of the resistor and capacitor used for a phase filter.

Further, the frequency error correction unit 103 calculates the phase difference θ0 detected by the position calculator 501 and the rotation angle θm of the resolver according to the dθ0/dt detected by the differential processing unit 505. Specifically, the above unit 103 outputs the value calculated with θm=θ0+D×(dθ0/dt)/(2π) as the resolver rotation angle θm. Here, the symbol D is the constant determined by the filter structure.

The structure of the adjuster 104 will be described. FIG. 10 is a circuit diagram showing one example of the structure of the adjuster according to the first embodiment. In FIG. 10, the adjuster 104 includes a D flip-flop 140, an UP/DOWN counter 141, a register 142, and an adder 143.

In the D flip-flop 140, a clock signal RCLK for determining the resistor value adjusting timing is input to a clock terminal and the signal. CAL is input to a terminal. The determination signal CAL is latched in the D flip-flop 140 at the rising of the RCLK and output as an up and down signal U/D.

The UP/DOWN counter 141 performs the count-up operation when the U/D value at the rising of the RCLK is 1, while performs the count-down operation when the U/D value is 0. Further, the output value of the UP/DOWN counter 141 is input to the phase shifter replica 304 as the control signal CTRL1, to control the bypass switches SW116-1 to 116-n in the phase shifter replica 304.

The adder 143 adds the correction signal ΔCTRL from the frequency error correction unit 103 to the CTRL1 and outputs the obtained value to the phase shifter 101 as the control CTRL2. The control signal CTRL2 controls the bypass switches SW116-1 to 116-n in the phase shifter 101.

Here, in the phase shifter 101 and the phase shifter replica 304, the bypass switches SW116-1 to 116-n are controlled so that the value of the serial resistor may be larger according as the CTRL1 and the CTRL2 become larger in the adjusting resistors R113-1 to 113-n. Specifically, the SW116-1 is controlled with the least significant bit of the CTRL1 and CTRL2 and the SW116-n is controlled with the most significant bit.

According to the above structure, the resolver correction device in the first embodiment can correct the frequency deviation accompanying the rotation of the rotor and correct the variation in the phase shift amount of the phase shifter replica for shifting the phase of the excitation signal.

Second Embodiment

Figure 11:
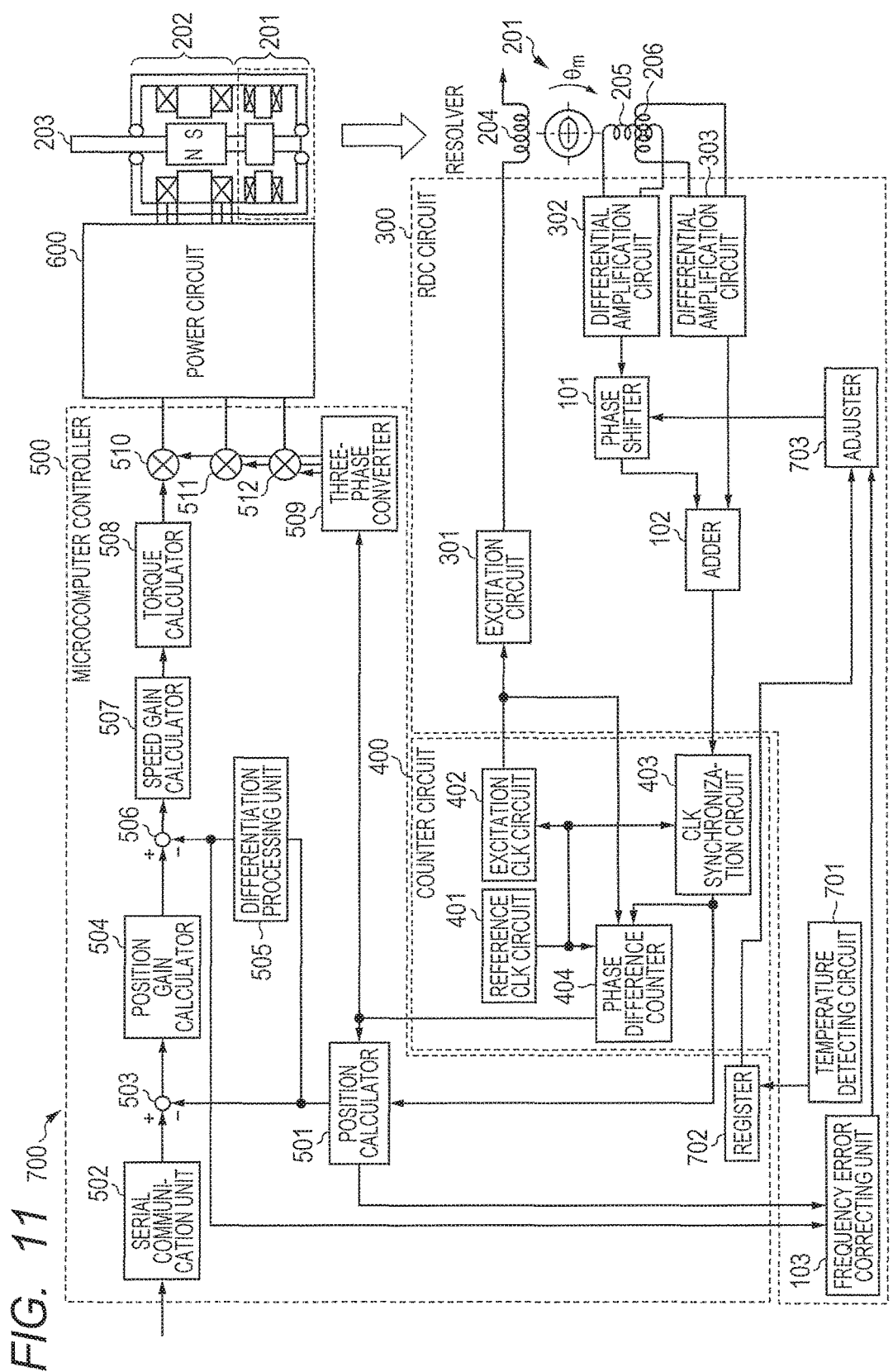
FIG. 11 is a block diagram showing the structure of a resolver correction device according to a second embodiment.

A second embodiment is different from the first embodiment in that the phase shifter replica is not provided and that the temperature detecting circuit is provided instead of the phase difference detector 305. FIG. 11 is a block diagram showing the structure of the resolver correction device according to the second embodiment. In FIG. 11, the same numerals are attached to the same components as in FIG. 2 and their description is omitted.

In FIG. 11, a resolver correction device 700 includes a temperature detecting circuit 701 and an adjuster 703 within the RDC circuit 300 and includes a register 702 within the microcomputer controller 500.

The temperature detecting circuit 701 outputs the temperature data obtained by measuring the temperature within the resolver correction device to the resister 702. For example, the temperature detecting circuit 701 measures the temperature of the semiconductor device with the resolver correction device mounted there.

The adjuster 703 calculates the adjusting amount of the phase shifter 101, based on the phase difference detected by the phase difference detector 305 and the output from the register 702.

The register 702 outputs the correction signal to the adjuster 703 based on the temperature data. For example, the register 702 may be provided with a table for associating the temperature data with the correction signal.

Figure 12:
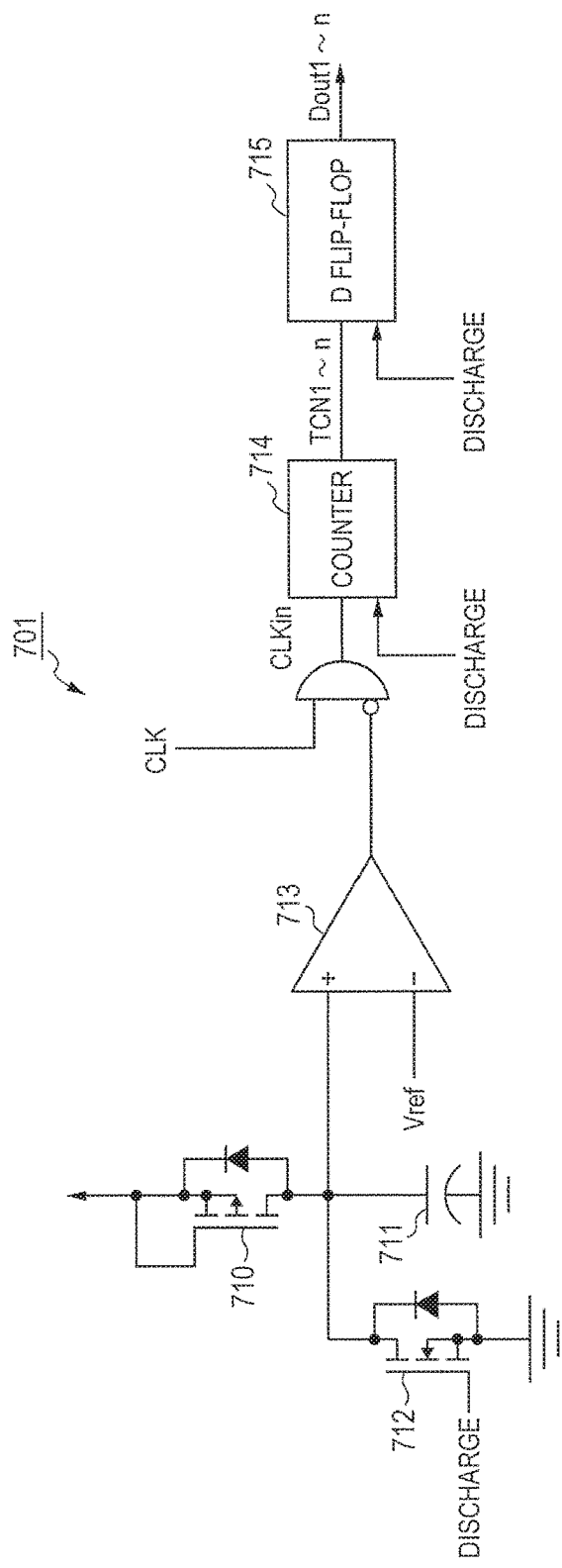
FIG. 12 is a circuit diagram showing one example of the structure of a temperature detecting circuit according to the second embodiment.

The structure of the temperature detecting circuit 701 will be described. FIG. 12 is a circuit diagram showing one example of the structure of the temperature detecting circuit according to the second embodiment. In FIG. 12, the temperature detecting circuit 701 includes a PMOS leakage source 710, a capacitor 711, an NMOS switch 712, a comparator 713, a counter 714, and a D flip-flop 715.

In the PMOS leakage source 710, a direct current voltage is applied to the gate and the source, and the drain is coupled to the comparator 713, the capacitor 711, and the source of the NMOS switch 712.

One end of the capacitor 711 is coupled to the drain of the PMOS leakage source 710 and the source of the NMOS switch 712 and the other end thereof is grounded.

In the NMOS switch 712, a reset signal DISCHARGE is applied to the gate, the source is coupled to the drain of the PMOS leakage source 710 and the capacitor 711, and the drain is grounded.

The comparator 713 compares the potential Vc of the capacitor 711 with the reference voltage Vref and outputs the above comparison result Vcmp to the counter 714.

The counter 714 counts the clock signal until the potential of the Vc exceeds the Vref.

In the D flip-flop 715, the output from the counter 714 is input to a D terminal and the reset signal DISCHARGE is input to a clock terminal.

Figure 13:
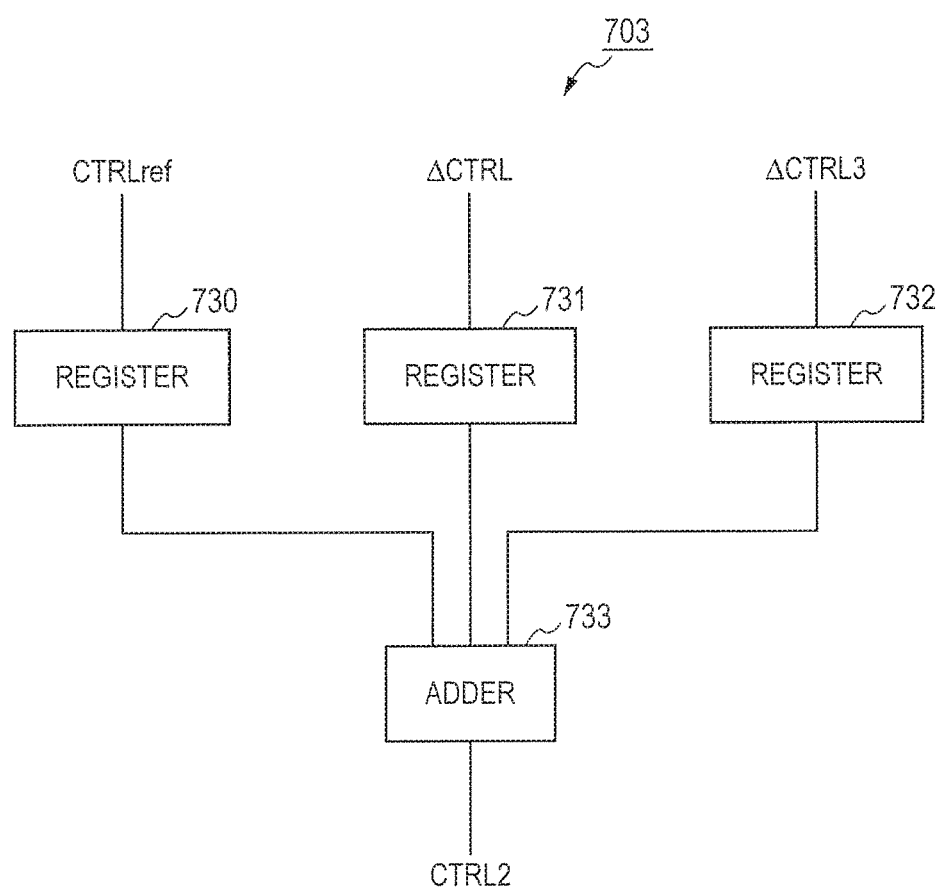
FIG. 13 is a circuit diagram showing one example of the structure of an adjuster according to the second embodiment.

The structure of the adjuster 703 will be described. FIG. 13 is a circuit diagram showing one example of the structure of the adjuster according to the second embodiment. In FIG. 13, the adjuster 703 includes registers 730, 731, and 732 and an adder 733.

The register 730 records the CTRLref when 80 θ0=π/2.

The register 731 determines the ΔCTRL so that it may compensate the frequency deviation accompanying the rotation of the resolver.

The register 732 determines the correction signal ΔCTRL3 so that it may compensate the fluctuation of the resistor value accompanying the temperature fluctuation.

Figure 14:
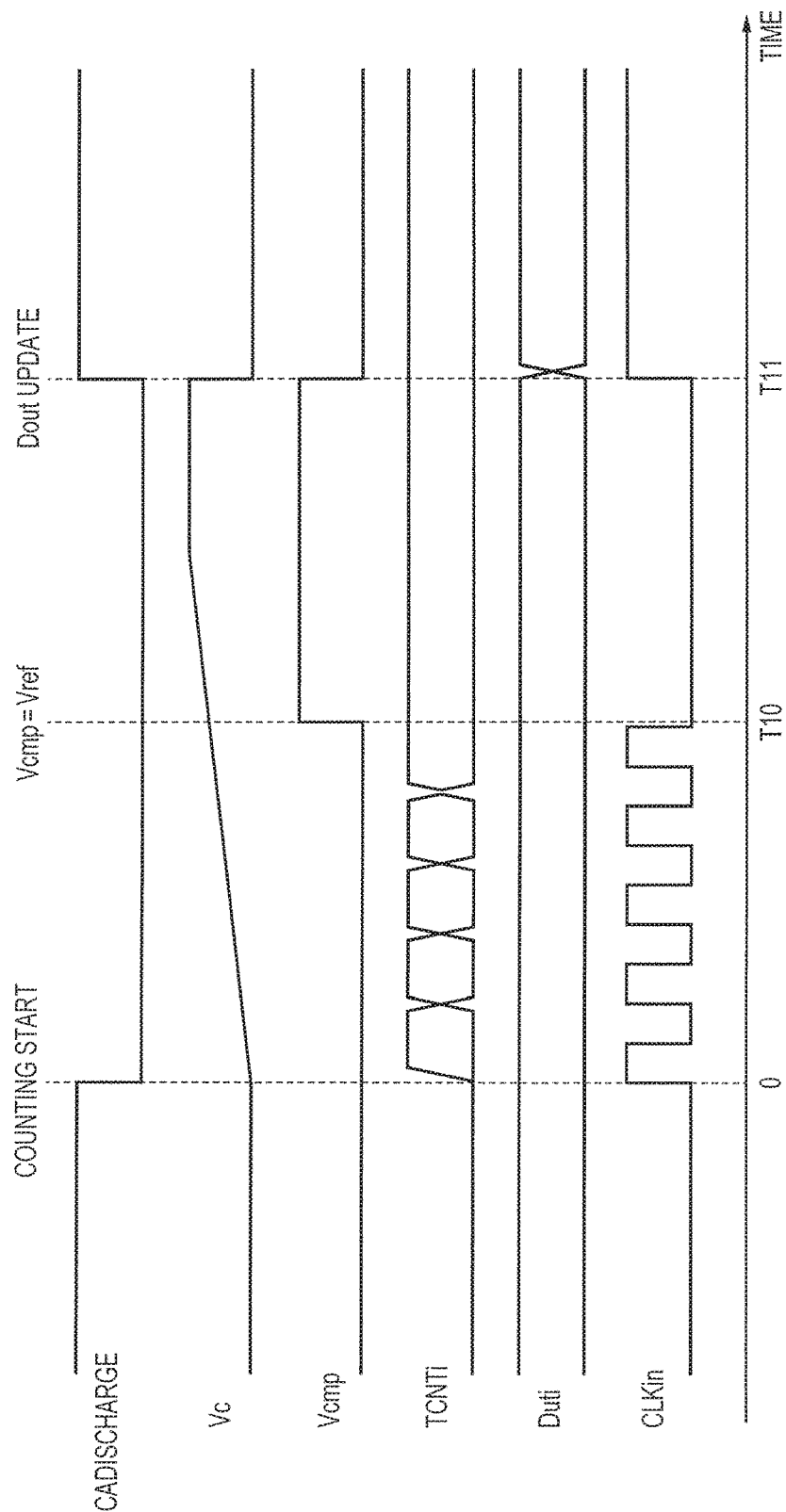
FIG. 14 is a view showing the operation waveform of the temperature detecting circuit 701 according to the second embodiment.

Next, the operation according to the second embodiment will be described. FIG. 14 is a view showing the operation waveform of the temperature detecting circuit 701 according to the second embodiment. In FIG. 14, the horizontal axis indicates time and the vertical axis indicates signal value. In FIG. 14, the symbol DISCHARGE shows the reset signal.

The Vc shows the potential of the capacitor 711. The Vcmp shows the comparison result from comparison between the potential Vc of the capacitor 711 and the reference voltage Vref. The TCNTi shows the output of the counter 714. The CLKin shows the clock signal until the potential of the Vc exceeds the Vref.

In the resolver correction device according to the second embodiment, at first, the calibration operation is performed.

In the calibration operation, under the condition of (1) the motor does not rotate and (2) the outside air temperature is the reference temperature, the excitation signal is input to the resolver 201. The counter circuit 400 detects the phase difference θ0 between the output signal of the adder 102 and the excitation signal of the excitation circuit 301. The register 702 adjusts the input signal CTRLref to the adjuster 104 so that the phase difference θ0 may be π/2. The CTRLref when θ0=π/2 is recorded in the register 702 as the reference signal.

In the temperature detecting circuit 701, when the reset signal DISCHARGE is 1, the NMOS switch 712 is turned on, the potential Vc of the capacitor 711 is 0, and the output Vcmp of the comparator is also 0. The counter 714 is reset and the counter outputs TCNT1 to n are all 0.

Next, when the DISCHARGE is 0, the capacitor 711 is charged by the leak current of the PMOS leakage source 710, the potential Vc rises and the counter 714 starts the count-up operation. The potential Vc exceeds the Vref after the elapse of the time T10=Vref×C/Ip since start of charge and the count-up operation stops. Then, at the time T11, the DISCHARGE rises up, the counter value is latched by the D flip-flop 715, and the value is recorded in the register 702.

The above operation of the temperature detecting circuit 701 is performed at first in the above calibration operation, and the counter value at that time is recorded in the register 702 as the reference counter value in the reference temperature.

Then, the operation of the temperature detecting circuit 701 is repeated at the intervals (for example, once in every one second) capable of fully following the temperature change and the output value of the updated D flip-flop 71 compared with the reference counter value.

Here, when the temperature gets higher, the leak current Ip of the PMOS leakage source 710 increases and the counter value decreases. On the contrary, when the temperature gets lower, the Ip decreases and the counter value increases. The register 702 calculates a temperature fluctuation width according to a difference between the reference counter value and the current counter value.

Since the resistor value fluctuates according to the temperature fluctuation in the resistor used for the phase shifter 101, the register 702 determines the correction signal ΔCTRL3 to compensate the fluctuation and outputs the CTRLref and the ΔCTRL3 to the adjuster 104.

The frequency error correction unit 103 outputs the correction signal ΔCTRL to the adjuster 104 based on the time differential of the rotation angle similarly to the first embodiment.

The adjuster 104 controls the bypass switches SW116-1 to 116-*n* within the phase shifter 101 according to the sum of the CTRLref, the ΔCTRL, and the ΔCTRL3 and adjusts the serial resistor value for adjusting resistors.

The resolver correction device according to the second embodiment can detect the resolver rotation angle with high precision without using a phase shifter replica, by measuring the temperature of the device and correcting the variation amount of the phase shift amount based on the measured temperature. As the result, the resolver correction device according to the second embodiment can detect the resolver rotation angle with high precision even in a small chip area and mounting area. The resolver correction device according to the second embodiment can prevent the rotation angle detection error caused by the characteristic variation between the phase shifter and the phase shifter replica because the calibration is performed by the phase shifter itself.

The above mentioned program can be stored in various types of non-transit computer readable medium to be supplied to a computer. The non-transitory computer readable medium includes various types of tangible storage medium. The non-transitory computer readable medium includes magnetic recording medium (for example, flexible disk, magnetic tape, hard disk drive), optical magnetic recording medium (for example, optical magnetic disk), CD-Read Only Memory (ROM) CD-R, CD-R/W, semiconductor memory (for example, mask ROM, Programmable ROM (PROM), Erasable PROM (EPROM), flash ROM, Random Access Memory (RAM). Alternatively, the program may be supplied to a computer by various types of transitory computer readable medium. The transitory computer readable medium includes electric signal, optical signal, and electromagnetic wave. The transitory computer readable medium can supply the program to a computer through wire communication channel such as electric wire and optical fiber, or wireless communication channel.

As set forth hereinabove, although the invention made by the inventor et al. has been described specifically based on the embodiments, it is needless to say that the invention is not restricted to the above mentioned embodiments but that various modifications are possible without departing from the spirit.

For example, the resolver correction device in the embodiments may be formed by a semiconductor device. When the resolver correction device is realized by a semiconductor device, the frequency deviation caused by the temperature change becomes remarkable. Since the semiconductor device has many circuit parts on the chip, the heating amount is larger and the distance between each circuit part is closer; therefore, it is largely affected by the temperature. Specifically, by the temperature rise of 100° C., the frequency is deviated by 20% and more in some cases.

Accordingly, the resolver correction device of the above embodiment can detect the larger frequency deviation accompanying the temperature change when it is realized by the semiconductor device.

What is claimed is:

1. A resolver correction device comprising:
   with respect to signals at least having two or more phases, including a first phase signal and a second phase signal, detected by a resolver excited by an excitation signal of a carrier frequency fc,
   a phase shifter comprising a first operational amplifier, a capacitor, and a switch, wherein the phase shifter shifts a phase of the first phase signal of the resolver;
   a first adder comprising a second operational amplifier, wherein the first adder adds the second phase signal and a third phase signal obtained by shifting the phase of the first phase signal, as a phase modulation signal with the excitation signal modulated by a rotation angle of a rotor in the resolver;
   a frequency error correction unit comprising multiple multipliers and a second adder, wherein the frequency error correction unit generates a phase difference correction signal, based on a phase difference between the phase modulation signal of the resolver and the excitation signal; and
an adjuster comprising a register, a third adder, and a counter, wherein the adjuster calculates an adjusting amount of the phase shifter, based on the phase difference correction signal,
wherein the phase shifter adjusts a phase shift amount according to the adjusting amount.

2. The device according to claim 1,
wherein the adjuster calculates the adjusting amount of the phase shifter, based on the phase difference correction signal and a variation of the phase shift amount according to a temperature change in the phase shifter.

3. The device according to claim 2, further comprising:
a phase shifter replica shifting a phase of the excitation signal of the resolver by the same phase shift amount as the phase shifter based on the adjusting amount; and
a phase difference detector which detects a phase difference between the excitation signal and the excitation signal phase-shifted by the phase shifter replica,
wherein the adjuster calculates the adjusting amount of the phase shifter, based on the phase difference detected by the phase difference detector and the phase difference correction signal.

4. The device according to claim 3, further comprising:
the resolver including an excitation coil and a plurality of detection coils;
an excitation circuit which generates the excitation signal and applies the excitation signal to the excitation coil; and
a differential amplification circuit which differentially amplifies a phase signal detected by the pluralities of detection coils and outputs at least the first phase signal and the second phase signal,
wherein the phase shifter shifts the phase of the first phase signal, and
wherein the adder adds the phase-shifted first phase signal and the second phase signal, as the phase modulation signal with the excitation signal modulated by the rotation angle of the rotor in the resolver.

5. The device according to claim 2, further comprising:
a temperature detecting circuit which measures a temperature of the resolver correction device, and
a register which calculates a variation of the phase shift amount of the phase shifter according to a temperature change, based on the temperature measured by the temperature detecting circuit,
wherein the adjuster calculates the adjusting amount of the phase shifter, based on the phase difference detected by the phase difference detector and the variation of the phase shift amount.

6. The device according to claim 1, further comprising:
a counter which counts a phase difference between the excitation signal and the phase modulation signal;
a position calculator which calculates a rotation position of the rotor, based on a count value of the phase difference; and
a differentiation processing unit which differentiates a signal at the rotation position and calculates a rotation speed of the rotor,
wherein the frequency error correction unit generates a phase difference correction signal based on the rotation speed of the rotor.

7. A semiconductor device comprising:
with respect to signals at least having two or more phases, including a first phase signal and a second phase signal, detected by a resolver excited by an excitation signal of a carrier frequency fc,
a phase shifter circuit comprising a first operational amplifier, a capacitor, and a switch, wherein the phase shifter shifts a phase of the first phase signal of the resolver;
a first adding circuit comprising a second operational amplifier, wherein the first adding circuit adds the second phase signal and a third phase signal obtained by shifting the phase of the first phase signal, as a phase modulation signal with the excitation signal modulated by a rotation angle of a rotor in the resolver;
a frequency error correction circuit comprising multiple multipliers and a second adder circuit, wherein the frequency error correction circuit generates a phase difference correction signal, based on a phase difference between the phase modulation signal of the resolver and the excitation signal; and
an adjusting circuit comprising a register, a third adding circuit, and a counter, wherein the adjusting circuit calculates an adjusting amount of the phase shifter, based on the phase difference correction signal,
wherein the phase shifter circuit adjusts a phase shift amount according to the adjusting amount.

* * * * *